J. T. POMEROY.
THILL-COUPLING.

No. 192,186. Patented June 19, 1877.

WITNESSES:
Gustave Dieterich
J. H. Scarborough

INVENTOR:
J. T. Pomeroy
BY
ATTORNEYS.

UNITED STATES PATENT OFFICE.

JULIUS T. POMEROY, OF EDGERTON, WISCONSIN.

IMPROVEMENT IN THILL-COUPLINGS.

Specification forming part of Letters Patent No. 192,186, dated June 19, 1877; application filed April 23, 1877.

*To all whom it may concern:*

Figure 1:
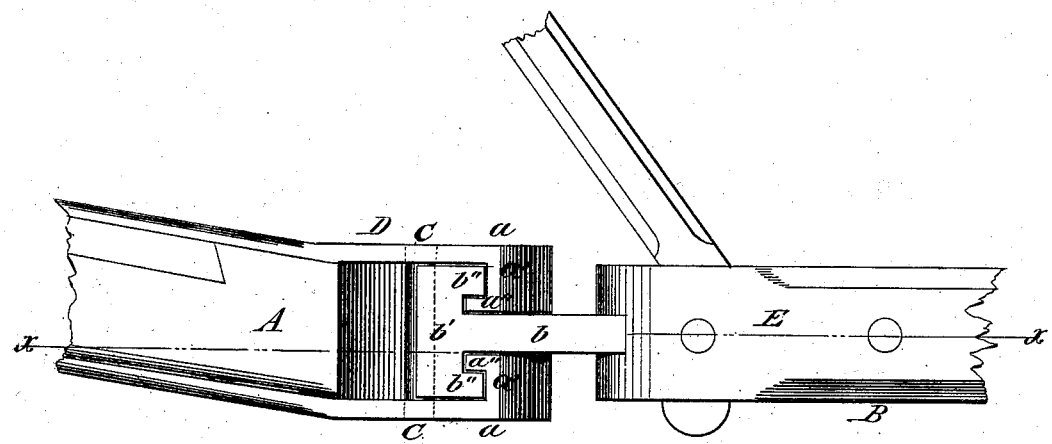
Figure 2:
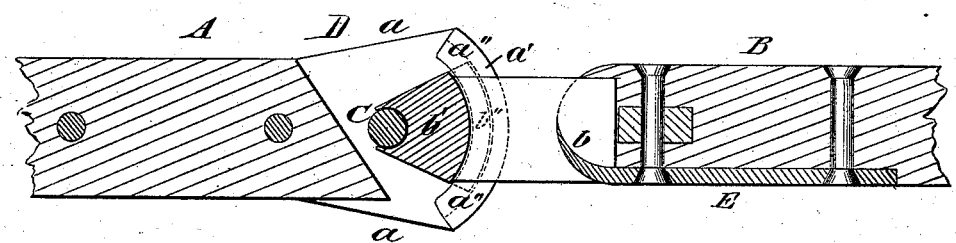

Be it known that I, JULIUS TAYLOR POMEROY, of Edgerton, Rock county, Wisconsin, have invented a new and Improved Thill-Coupling, of which the following is a specification:

Figure 1 is a bottom plan view of my improved thill-coupling, and Fig. 2 is a longitudinal section on line $x\,x$, Fig. 1.

The object of my invention is to provide a simple, effective, and safe thill-coupling, by which the thills may be readily attached to and removed from a vehicle.

The coupling in the present case is attached to the frame of a platform-wagon.

A represents a part of the frame of the wagon, and B the thills. D is a socket, which consists of the side pieces $a$, having the arc-shaped flanges $a'$, upon which ribs $a''$ are formed, which are also arc-shaped, and project inwardly from the flange $a'$ parallel with the sides $a$. C is a round rivet or bar that connects the side pieces $a$, and is arranged at the center of the circle upon which the arc-shaped flanges $a'$ are formed. The part of the coupling that is attached to the thills consists of a bar, $b$, that is attached to a plate, E, that is fastened to the thills, and upon which a sector-shaped head, $b'$, is formed. This head is provided with a semicircular groove for receiving the bar C, and it fits the socket D sidewise, and also fills it between the bar C and the ribs $a''\,a''$. Ribs $b''$ are formed on the convex surface of the head $b'$ that fill the space between the ribs $a''$ and sides $a$. The thills are removed from the vehicle by raising them into a vertical position, when the head $b'$ may be lifted from the socket D. The thills are attached by reversing the operation.

It is obvious that this coupling may be applied to poles as well as thills, and also that its form may be modified to adapt it to vehicles of different sorts.

Having thus described my invention, I claim as new, and desire to secure by Letters Patent—

The side pieces $a\,a$, connected by rivet C, and having ribbed flanges $a'\,a''$, in combination with the plate E, having bar $b$, and grooved ribbed head $b'\,b''$, as and for the purpose specified.

JULIUS TAYLOR POMEROY.

Witnesses:
J. P. TOWNE,
ALLAN BURDICK.